United States Patent
Schneider (10) Patent No.: US 10,169,366 B2
(45) Date of Patent: Jan. 1, 2019

(54) DEDUPLICATED FILE SYSTEM

(71) Applicant: Red Hat, Inc., Raleigh, NC (US)

(72) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 15/385,176

(22) Filed: Dec. 20, 2016

(65) Prior Publication Data

US 2017/0103086 A1   Apr. 13, 2017

Related U.S. Application Data (63) Continuation of application No. 12/324,072, filed on Nov. 26, 2008, now Pat. No. 9,542,409.

(51) Int. Cl.
*G06F 17/30* (2006.01)
*G06F 3/06* (2006.01)

(52) U.S. Cl.
CPC ...... *G06F 17/30156* (2013.01); *G06F 3/0607* (2013.01); *G06F 3/0619* (2013.01); *G06F 3/0631* (2013.01); *G06F 3/0641* (2013.01); *G06F 17/3015* (2013.01); *G06F 17/30097* (2013.01); *G06F 17/30961* (2013.01); *G06F 3/0608* (2013.01)

(58) Field of Classification Search
CPC ............ G06F 17/30156; G06F 3/0607; G06F 3/0619; G06F 3/0631; G06F 3/0641; G06F 17/30097; G06F 17/30961
See application file for complete search history.

(56) References Cited

U.S. PATENT DOCUMENTS

| | | | |
|---|---|---|---|
| 5,530,958 A | 6/1996 | Agarwal et al. | |
| 5,802,521 A | 9/1998 | Ziauddin et al. | |
| 6,275,919 B1 | 8/2001 | Johnson | |
| 6,381,601 B1 | 4/2002 | Fujiwara et al. | |
| 6,434,662 B1 | 8/2002 | Greene et al. | |
| 6,587,915 B1 | 7/2003 | Kim | |
| 6,591,317 B1 | 7/2003 | Schzukin et al. | |
| 7,454,592 B1 | 11/2008 | Shah et al. | |
| 7,640,262 B1 | 12/2009 | Beaverson et al. | |
| 7,747,584 B1 * | 6/2010 | Jernigan, IV | G06F 17/30156 707/692 |
| 8,190,835 B1 * | 5/2012 | Yueh | G06F 3/0608 711/159 |

(Continued)

*Primary Examiner* — Tyler J Torgrimson
(74) *Attorney, Agent, or Firm* — Lowenstein Sandler LLP (57) ABSTRACT

An apparatus and a method for maintaining a file system is described. A method may include receiving a request for allocating a first block of a file system to a file, the first block comprising a first data and computing, by a processing device, a first hash value of the first block. The method also includes comparing, by the processing device, the first hash value with a plurality of hash values in a tree structure, wherein each of the plurality of values correspond to a block among a plurality of blocks stored in the file system. The method further includes in response to determining that a match exists between the first hash value and at least one of the plurality of hash values in the tree structure, allocating, by the processing device, the corresponding block to the file; and updating, by the processing device, a reference count of the corresponding block in the tree structure.

20 Claims, 5 Drawing Sheets

(56) References Cited

U.S. PATENT DOCUMENTS

| | | |
|---|---|---|
| 9,465,823 B2 | 10/2016 | Shergill et al. |
| 2005/0071436 A1 | 3/2005 | Hsu et al. |
| 2005/0091469 A1 | 4/2005 | Chiu et al. |
| 2006/0041597 A1 | 2/2006 | Conrad et al. |
| 2006/0074922 A1 | 4/2006 | Nishimura |
| 2006/0095458 A1 | 5/2006 | Siu et al. |
| 2006/0179071 A1 | 8/2006 | Panigrahy et al. |
| 2007/0022148 A1 | 1/2007 | Akers et al. |
| 2007/0050423 A1* | 3/2007 | Whalen ............. G06F 17/30159 |
| 2007/0208788 A1 | 9/2007 | Chakravarty et al. |
| 2007/0239756 A1 | 10/2007 | Li et al. |
| 2007/0266037 A1 | 11/2007 | Terry et al. |
| 2008/0098083 A1* | 4/2008 | Shergill ............ G06F 17/30303 709/217 |
| 2009/0083610 A1 | 3/2009 | Arai et al. |
| 2011/0131390 A1* | 6/2011 | Srinivasan ............ G06F 3/0622 711/209 |
| 2017/0103086 A1* | 4/2017 | Schneider ......... G06F 17/30156 |
| 2017/0228392 A1* | 8/2017 | Schneider ......... G06F 17/30156 |

* cited by examiner

DEDUPLICATED FILE SYSTEM

CROSS-REFERENCE TO RELATED APPLICATIONS

The present application is a continuation of U.S. patent application Ser. No. 12/324,072 filed on Nov. 26, 2008, which is incorporated herein by reference in its entirety.

TECHNICAL FIELD

Embodiments of the present invention relate to computing systems, and more particularly, to allocation of blocks in a UNIX-based file system.

BACKGROUND

An inode, in a UNIX-based file system, is a data structure used to store information, such as metadata, about a file, whereas data blocks are structures used to store the actual data for the file. The information contained in an inode may include ownership of the file, access permission for the file, size of the file, file type and references to locations on disk of the data blocks for the file. The references to the locations of the file data are provided by pointers in the inode, which may further reference indirect blocks that, in turn, reference data blocks, depending on the quantity of data in the file. Changes to the inodes and data blocks are made "in-place" in accordance with the write in-place file system. If an update to a file extends the quantity of data for the file, an additional data block is allocated and the appropriate inode is updated to reference that data block.

While there is some provision for reducing duplication of data blocks through the use of file system links, there are still some limitations:

Creating and maintaining the links is essentially a manual process. There are some tools available. However, these tools have to be configured and managed.

The links are treated identically to the original file in the case of hard links—changes to one change all of them. This also happens with soft links, to a somewhat lesser degree. A soft link can have different permissions than the underlying file. However using a soft link to change the file still changes the original file.

Reorganizations can leave dangling soft links that point to files that no longer exist, or to places they should not.

Two files that are mostly the same take up the same space as two files that are not related at all.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for maintaining a file system is described. In one embodiment, a method to reduce duplication of data blocks is described. An allocation module receives a request from a kernel module to allocate a block of the file system to a file. The allocation module examines another block of the file system to determine whether the other block contains a same data as the first block. The allocation module also determines an external reference count of the other block containing the same data. The other block is then allocated to the file and the external reference count is updated accordingly.

In another embodiment, to avoid duplication of file systems, an allocation module manages the allocation of blocks to a file so that if the block contains the same data as an already allocated block, the file gets allocated the already allocated and written block.

The present application is applicable to deduplicating blocks. In a first application, blocks that are duplicates take up extra storage space. In this instance, the present application provides for a technique to reduce such block duplication. In a second application, creating or editing a file may be performed in such a way as to reduce or minimize the number of blocks used to store data. If data from the file is already stored in a pre-existing block, there would be no need to create another block for that file.

Those of ordinary skills in the art will recognize that the concept presented in this application is not solely limited to Unix-based operating system but may also be applicable to other operating file systems.

Figure 1:
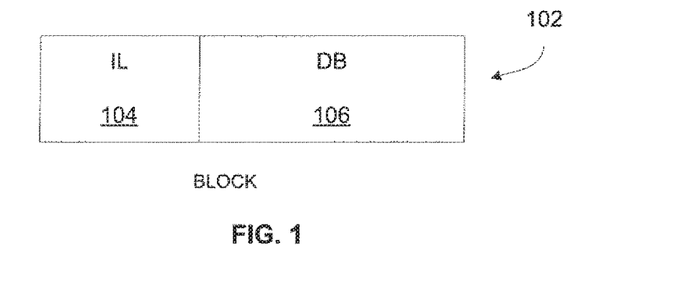
FIG. 1 is a block diagram illustrating a block of a file system.

FIG. 1 is a block diagram illustrating a block 102 of a file system of a UNIX based operating system. Block 102 includes an inode 104 and a data block 106. Inodes 104 and data block 106 are logically and physically separate entities. A disk (or disk partition) is formatted to contain a set of block groups (i.e. groups of sector clusters called blocks, each group can be n blocks in length, each block can be up to 4 KB), each of which contains a superblock (1 block), group descriptor information (n blocks), a data block bitmap 106 (1 block), inode bitmap 104 (1 block), a table of inodes (information nodes, each of which is a data record of 128 bytes in length) for the files in the block group (n blocks), and the data blocks (n blocks or clusters of sectors). Block groups are like logical sub-partitions that are used to reduce file fragmentation as Linux stores individual files within a block group.

A block descriptor holds descriptions of blocks within a block group. Block sizes may be 512-4096 bytes. A single block may contain descriptions for up to 8,192 blocks.

Each file in the system is described with an inode data structure. An inode is a data record in the inode table that describes which blocks on the device are occupied by a particular file, as well as the access rights, modification times, and type of the file. Every file in the file system is represented by a single inode (an entry in the block group's inode table). Each inode is referenced by a single unique identifying number, called the inode number, which is used to link the file's name/entry in a directory file, to the inode structure in the inode table in the group block.

Each inode is 128 bytes in length and contains information such as file mode (a 16 bit entry that indicates the file type (regular, directory, character, et.) owner/group/other read/write/execute permissions) owner ID, Group ID, file size, time/date last modified, time/date last accessed, and the file (block) addresses, which consist of pointers to the data blocks. File data blocks are referenced directly by the inode, and the remainder (up to 1074791424) indirectly by data blocks acting as index pointers.

In one embodiment, allocated blocks are changed according to the following process: for example, if file A has data blocks 1, 2, and 3, and file B has data blocks 2 and 3, when something writes to data block 2 from the context of file A (say, a text editor program, which is being used to edit file A), the system needs to allocate a new block matching the content to be written, decrement the reference count on block 2, and update A's mode to point to the new block (call it block #4), making A's data blocks 1, 4, and 3.

Figure 2:
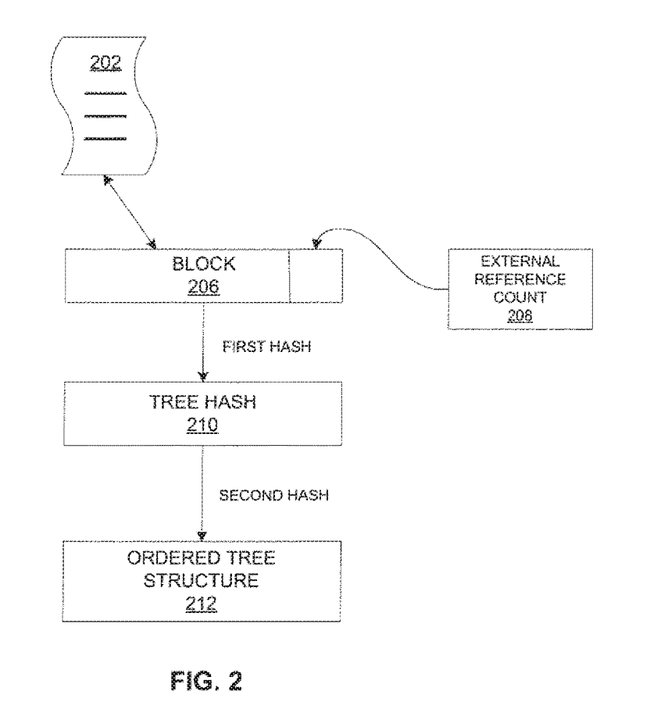
FIG. 2 is a block diagram illustrating one embodiment of allocating blocks to a file of a file system.

FIG. 2 is a block diagram illustrating one embodiment of allocating blocks to a file 202 of a file system. To begin with, since a block may be allocated to more than one file, an external reference count 208 for the block would be needed. Also, to speed up searching for a block to allocate, hash values for allocated blocks should be maintained. The reference count could replace the current allocation bitmap used in the EXT2 file system, or it could be stored separately. On a 32 bit system using 4 k blocks, it would take 256 blocks (1 MB) of reference counts to track a gigabyte of allocatable blocks.

The hash values would be a more complicated matter—for efficient searching, they would need to be stored in a more complicated structure than an unsorted list. Also, to be effective, the hashes would need to take significantly more room than a simple pointer, so an unsorted list would be prohibitively large in any case.

In one embodiment, a two-level hashing process is used where each allocated block 206 is hashed using a fast algorithm with a small result (e.g. a CRC-16 variant), as well as a longer, more industrial-strength hashing algorithm (e.g. SHA1, or SHA256 or 512). The first hash 210 would be used as an index into a list of b-tree structures, where the b-tree structures are each ordered by the second hash 212, with values being the block numbers. With a 16-bit first level hash, this would require a minimum of 65,536 blocks for second level b-trees (256MB, on a system that uses 4 k blocks). However, on a large disk, the overhead would be small in relative terms.

Figure 3:
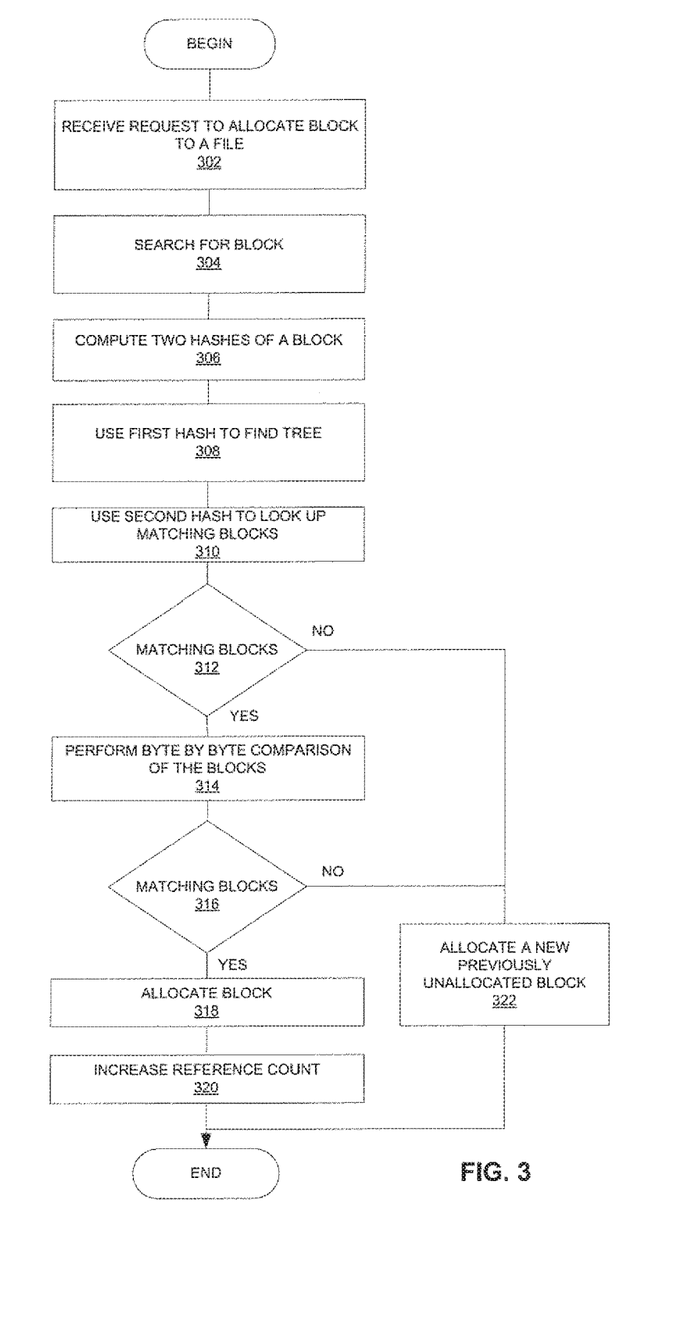
FIG. 3 is a flow diagram illustrating one embodiment of a method for allocating blocks to a file of a file system.

FIG. 3 is a flow diagram illustrating one embodiment of a method for allocating blocks to a file of a file system. At 302, a request to allocate a block to a file is received. At 304, a search for a block to allocate is performed by computing the two hashes of the block at 306 to see if there's a match already allocated by using the first hash to find the appropriate b-tree at 308, and then using the second hash to look up any matching blocks at 310. If matching blocks are found at 312, a byte-by-byte comparison of the matches is performed against the block to be allocated at 314. And if it matches one of the found blocks at 316, that block is allocated at 318, and its reference count is incremented at 320.

If there are no matching blocks at 312 and 316, a new previously unallocated block is allocated.

Figure 4:
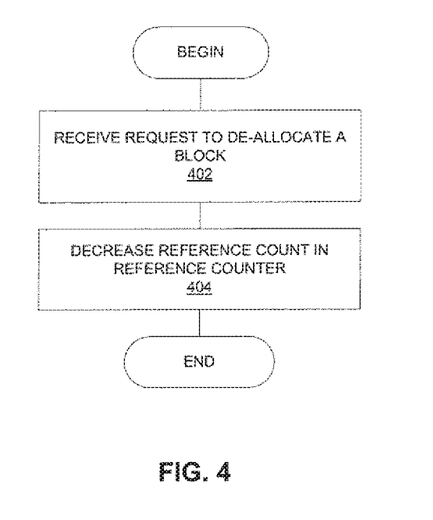
FIG. 4 is a flow diagram illustrating one embodiment of a method for de-allocating blocks to a file of a file system.

FIG. 4 is a flow diagram illustrating one embodiment of a method for de-allocating blocks to a file of a file system. A request to de-allocate a block to a file is received at 402. Deallocating a block would require decrementing the reference count in the reference count map at 404. If the reference count goes to zero at 406, the deallocator computes the two block hashes at 408 to delete it from the appropriate b-tree at 410.

Figure 5:
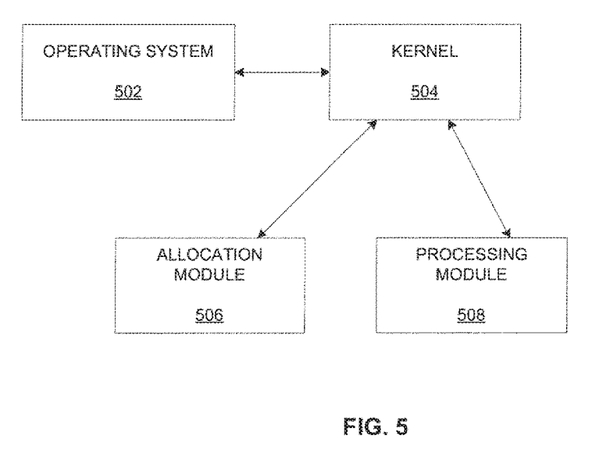
FIG. 5 is a block diagram illustrating one embodiment of logical components of a computer system.

FIG. 5 is a block diagram illustrating one embodiment of logical components of a computer system. A UNIX based operating system 502 includes a file system having software for controlling the transfer of data. A kernel module 504 communicates with the OS 502 to maintain various system services such as memory management, timer, synchronization, and task creation. An allocation module 506 and a processing module 508 interact with the kernel module 504 to carry out block allocation and processing operations. Allocation modules 506 and processing modules 508 may either be integral to OS 502 or operate as independent modules and may be implemented in hardware and/or software.

Figure 6:
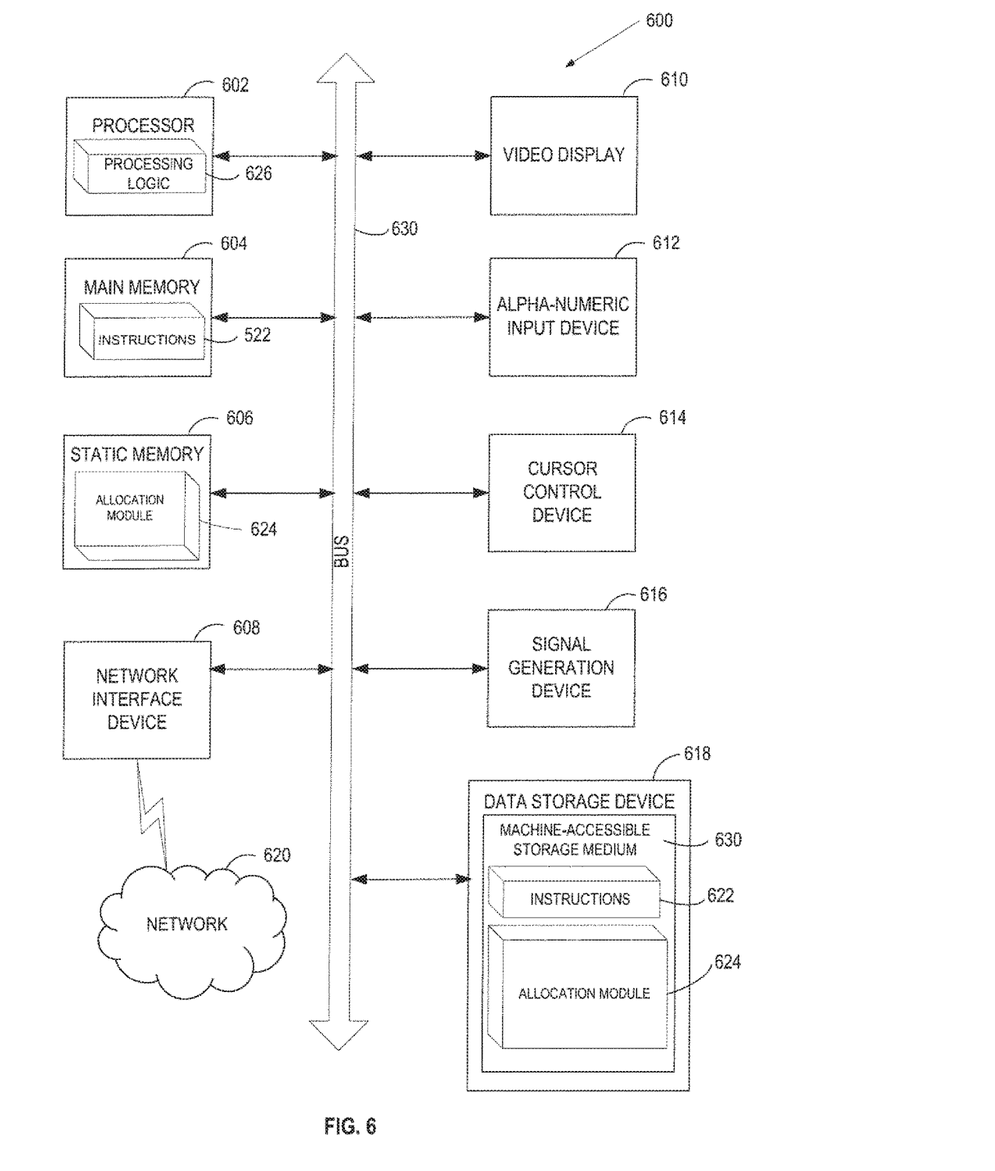
FIG. 6 is a block diagram illustrating an example of a computer system.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute modules 626 (previously described with respect to FIG. 1) for performing the operations and steps discussed herein with. In one embodiment, the modules may include hardware or software or a combination of both.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-accessible storage medium 630 on which is stored one or more sets of instructions (e.g., software 622) embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting computer-accessible storage media. The software 622 may further be transmitted or received over a network 620 via the network interface device 608.

The computer-accessible storage medium 630 may also be used to store the allocation module 624 as presently described. The allocation module 624 may also be stored in other sections of computer system 600, such as static memory 606.

While the computer-accessible storage medium 630 is shown in an exemplary embodiment to be a single medium, the term "computer-accessible storage medium" should be taken to include a single medium or multiple media (e.g., a centralized or distributed database, and/or associated caches and servers) that store the one or more sets of instructions. The term "computer-accessible storage medium" shall also be taken to include any medium that is capable of storing, encoding or carrying a set of instructions for execution by the machine and that cause the machine to perform any one or more of the methodologies of the present invention. The term "computer-accessible storage medium" shall accordingly be taken to include, but not be limited to, solid-state memories, optical and magnetic media.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The present method for deduplicated file system may be particularly useful for a system that is used to mirror several software repositories, particularly one that is used to mirror several versions of several software repositories. A great deal of space could be saved as a result of implementing the deduplicated file system.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving a request for allocating a first block of a file system to a file;
   computing, by a processing device, a first hash value of the first block;
   comparing, by the processing device, the first hash value with a plurality of hash values, wherein each of the plurality of hash values correspond to a block of a plurality of blocks stored in the file system;
   determining that a match exists between the first hash value and a second hash value of the plurality of hash values in view of the comparing;
   allocating, by the processing device, a corresponding block associated with the second hash value to the file in view of the match;
   updating, by the processing device, a reference count in the first block in view of allocating the corresponding block; and
   replacing, by the processing device, a mapping indicator stored by the file system to track allocations of the first block with a reference to the updated reference count in the first block.

2. The method of claim 1 further comprising, responsive to determining that the match does not exist between the first hash value and the second hash value, allocating, by the processing device, a second block that is previously unallocated, wherein the second block is different from the first block.

3. The method of claim 1, further comprising increasing the reference count of the corresponding block allocated to the file.

4. The method of claim 3, further comprising deleting the corresponding block in response to the reference count of the corresponding block being zero.

5. The method of claim 4, wherein the corresponding block is deleted in view of the first hash value.

6. The method of claim 1, further comprising deallocating the first block from the file.

7. The method of claim 6, further comprising decreasing a reference count of the first block deallocated from the file.

8. A non-transitory computer readable storage medium comprising data that, when accessed by a processing device causes the processing device to:
- compute, by the processing device, a first hash value of a first block of a file system in view of a request to allocate the first block to a file;
- compare the first hash value with a plurality of hash values, wherein each of the plurality of hash values correspond to a block of a plurality of blocks stored in the file system;
- responsive to determining that a first match exists between the first hash value and a set of hash values of the plurality of hash values in view of the compared, perform a byte-by-byte comparison between the first block and a set of blocks of the plurality of blocks corresponding to the set of hash values;
- determine whether a second match exists between the first block and at least one of the set of blocks in view of the byte-by-byte comparison, wherein the second match is different from the first match;
- responsive to determining that the second match exists, allocate the corresponding block to the file;
- update a reference count stored in the first block in view of allocating the corresponding block; and
- replace a mapping indicator stored by the file system to track allocations of the first block with a reference to the updated reference count in the first block.

9. The non-transitory computer readable storage medium of claim 8, wherein the processing device is further to responsive to determining that the match does not exist between the first hash value and the second hash value, allocate a second block that is previously unallocated, wherein the second block is different from the first block.

10. The non-transitory computer readable storage medium of claim 8, wherein the processing device is further to responsive to determining that the second match does not exist in view of the byte-by-byte comparison, allocate a second block that is previously unallocated, wherein the second block is different from the first block.

11. The non-transitory computer readable storage medium of claim 8, wherein the processing device is further to increase the reference count of the corresponding block allocated to the file.

12. The non-transitory computer readable storage medium of claim 8, wherein the processing device is further to delete the corresponding block in response to the reference count being zero.

13. The non-transitory computer readable storage medium of claim 8, wherein the processing device is further to deallocate the first block from the file.

14. The non-transitory computer readable storage medium of claim 13, wherein the processing device is further to decrease a reference count to the first block deallocated from the file.

15. A system comprising:
- a memory;
- a processing device operatively coupled to the memory, the processing device is to:
  - determine an update to a content of a first block among a plurality of blocks stored in a file system;
  - responsive to determining the update, compare the updated content data of the first block with a content of data in at least one of the plurality of blocks;
  - determine a match between a first hash value of the first block with at least one hash value among a plurality of hash values in view of the compared, each of the plurality of hash values correspond to each of the plurality of blocks;
  - responsive to determining the match, allocate the corresponding block to the file;
  - update a reference count stored in the first block in view of allocating the corresponding block; and
  - replace a mapping indicator stored by the file system to track allocations of the first block with a reference to the updated reference count in the first block.

16. The system of claim 15, wherein the processing device is further to increase the reference count of the corresponding block allocated to the file.

17. The system of claim 15, wherein the processing device is further to deallocate the first block from the file.

18. The system of claim 17, wherein the processing device is further to decrement a reference to the first block dellocated from the file.

19. The system of claim 15, wherein the processing device is further to delete the corresponding block in response to the reference count of the corresponding block being zero.

20. The system of claim 19, wherein the corresponding block is deleted in view of the first hash value.

* * * * *